United States Patent [19] [11] Patent Number: 4,838,954
Perach [45] Date of Patent: Jun. 13, 1989

[54] PRESSURE REGULATOR

[76] Inventor: Asi Perach, 29650 White Hall Dr., Farmington Hills, Mich. 48018

[21] Appl. No.: 186,026

[22] Filed: Apr. 25, 1988

[51] Int. Cl.⁴ .............................................. F15B 13/44
[52] U.S. Cl. ........................... 137/625.65; 137/625.17; 137/625.24; 251/129.08; 251/129.15; 335/272
[58] Field of Search ...................... 137/625.17, 625.24, 137/625.65; 251/129.02, 129.08, 129.11, 129.15; 335/272, 274

[56] References Cited

U.S. PATENT DOCUMENTS

| Re. 25,992 | 3/1966 | Molitor | 335/272 X |
| 2,863,103 | 12/1958 | Tancred | 335/274 X |
| 3,008,070 | 11/1961 | Nemeth | 335/274 X |
| 3,023,779 | 3/1962 | Cinnirella | 137/625.65 |
| 3,229,171 | 1/1966 | Daugherty | 335/272 |
| 4,504,770 | 3/1985 | Burkel et al. | 335/272 X |
| 4,694,849 | 9/1987 | Rampen | 137/625.24 X |

Primary Examiner—Gerald A. Michalsky
Attorney, Agent, or Firm—Arnold S. Weintraub; Gerald R. Black

[57] ABSTRACT

A pressure regulator continuously actuates the relative axial position and the tangential position of an armature relative to a valve body into the desired position so as to deliver a fluid at a constant pressure. The tangential position of the armature is determined in response to an electrical excitation of a coil resulting in a change in the magnetic forces applied to the armature. The axial position of the armature is adjusted in response to changes in the control pressure. The armature has a plurality of ports which enable fluid to enter and leave therefrom. The valve body has a plurality of ports in fluid communication with the armature ports. The armature has two elongated prongs. A compression spring is generally centrally disposed within the electromagnetic compartment of the armature. One end of the spring is secured to the armature and the other end of the spring is secured to the regulator housing. The armature is movable rotatably relative to the regulator, the spring resisting the rotational movement of the armature. The armature is movable axially relative to the regulator, the spring resisting the axial movement of the armature. A washer is positioned within the housing and about the armature. A flux path is generated through the washer, the housing, and the armature as the electrical current is varied. The rotational position of the armature relative to the washer is varied in response to the change in the current.

20 Claims, 7 Drawing Sheets

PRESSURE REGULATOR

BACKGROUND OF THE INVENTION

1. Field of the Invention

The present invention relates to pressure regulators, and more particularly, to hydraulic pressure regulators for electronically-controlled automatic transmissions.

2. Background Art

Electronically-controlled transmission systems control and regulate the control pressure of a fluid as a function of an electronic control signal. As the electric coil is energized, the position of the armature is varied to effect fluid dynamics. The relationship of the control pressure to the applied current must be distinct and repeatable, so that a specific current will result in a predictable line pressure. Although such systems hold considerable promise, available designs are mechanically complex and do not operate efficiently.

Conventional devices include as many as six moving parts. With the recent refinements in the manufacture of complex metal shapes, it is now possible to make metal parts having complex shapes with the same precision and ease as plastic parts. What is needed is a simplified and practical design involving a new armature and pressure regulator, wherein the relative axial position and the tangential position of the armature is continuously actuated into the desired position so as to deliver a fluid at a constant pressure.

SUMMARY OF THE INVENTION

The present invention combines rotational motion and axial motion of an armature in a pressure regulator. The rotational position of the armature is adjusted in response to an electrical excitation of a coil resulting in a change in the magnetic forces applied to the armature. The axial position of the armature is adjusted in response to changes in the pressure of the fluid as controlled by the regulator. The axial displacement of the armature is a function of the regulator control pressure. The axial movement of the armature does not change the size of the electromagnetic gap. The tangential displacement of the armature is a direct result of the electromagnetic torque: the current flowing through the coil.

The invention employs metal machining or metal injection molding technology for a new armature design that efficiently controls line pressure in response to small fluctuations in line current, thereby replacing more conventional designs that use multiple moving parts. The pressure regulator is a simplified design in which only the armature and a compression spring move during normal operation, and the control pressure is strictly proportional to the electric current. The fluid forces move the armature in the axial direction and the magnetic forces move the armature in the tangential direction. Hence, these independent forces are acting on the armature normal to each other.

This device is a controlled pressure line which is proportional to the applied current. The valve has a built-in self-correcting pressure mechanism. The pressure regulator has an armature which moves both axially and tangentially. However, the tangential movement of the armature is independent of the axial movement of the armature. The regulator maintains a constant control pressure within a range of fluid flow.

The pressure regulator has a hydraulic compartment and an electromagnetic compartment; the two compartments being physically separate from each other. An elongated armature is generally centrally disposed within the pressure regulator, the armature having a hydraulic portion and an electromagnetic portion. The hydraulic portion is generally centrally disposed within a valve body. The armature has a plurality of ports which enable fluid to enter and leave therefrom. The valve body has a plurality of ports generally aligned with some of the armature ports, the armature ports being in fluid communication with each other. The armature has an electromagnetic compartment with two elongated prongs, the prongs being made of a magnetic material.

The hydraulic portion of the armature preferably has an even number of supply ports, an even number of control ports, and an even number of exhaust ports. The supply ports are evenly spaced around the circumference of the armature, and are centered about a plane which is normal to the axis of the armature. The control ports are evenly spaced around the circumference of the armature, and are centered about a plane which is normal to the axis of the armature. The exhaust ports are evenly spaced around the circumference of the armature, and are centered about a plane which is normal to the axis of the armature. There are a like number of ports in the valve body, which are similarly arranged thereabout. These ports cooperate to determine the axial position of the armature relative to the valve body. As the armature is displaced tangentially or axially relative to the valve body, the size of the orifices through which the fluid flows is varied.

A compression spring is generally centrally disposed within the electromagnetic compartment of the armature. One end of the spring is secured to the regulator housing by a spring adjustment mechanism and the other end of the spring is secure to the armature by the prongs. The spring has an inwardly folded tail located at each spring end. Each tail passes through the center of the spring. The first tail is engaged within an adjustable seat, the seat being affixed to the regulator housing. The second tail is engaged in a recess between two fingers which are integral to the armature. One end of the spring is secured to the armature and the other end of the spring is secured to the spring adjustment mechanism. The armature is movable rotatably relative to the regulator, as the spring resists the rotational movement of the armature. The armature is movable axially relative to the regulator, as the spring resists the axial movement of the armature. The armature and the spring are the only moving parts of the regulator.

A housing is disposed around the electromagnetic compartment of the regulator. A bobbin is positioned around an electromagnet coil and around the armature. A washer is positioned within the housing and about the armature. The housing, the armature, and the washer each made of magnetizable materials. The armature is rotatable relative to the housing. The washer is disposed around the armature between the valve body and the housing. A flux path acts as the electromagnetic means for adjusting the rotational position of the armature relative to the housing, the flux path being generated through the washer and the housing and the armature based upon variations in the amount of electric current.

For a more complete understanding of the pressure regulator of the present invention, reference is made to the following detailed descriptions and accompanying drawings in which the presently preferred embodiment of the invention are illustrated by way of example. It is expressly understood, however, that the drawings are for purposes of illustration and description only, and are not intended as a definition of the limits of the invention. Throughout the following description and drawings, identical reference numbers refer to the same component throughout the several views.

DETAILED DESCRIPTION OF THE INVENTION

As referred to herein, the direction of all tangential movement is determined by looking at the electromagnetic end of the regulator.

Figure 1:
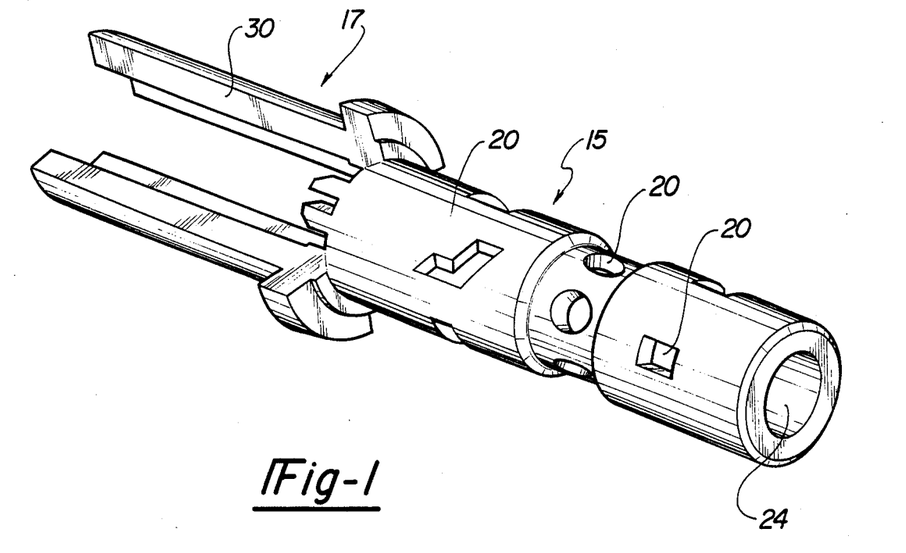
FIG. 1 depicts a perspective view of the armature that is used in the pressure regulator of the present invention.

Referring now to the drawings, FIG. 1 is a perspective view of the preferred embodiment of the armature 12 that is used in the pressure regulator 10. The regulator 10 include a hydraulic compartment 14 and an electromagnetic compartment 16, the two compartments being physically separated from each other.

The armature 12 is elongated and is generally centrally disposed within the pressure regulator 10, the armature 12 having a hydraulic portion 15 and an electromagnetic portion 17. The hydraulic portion 15 is generally centrally disposed within a valve body 18. The armature 12 has a plurality of ports 20 (supply 42, control 44, and exhaust 46) which enable fluid to enter and leave therefrom. The valve body 18 has a plurality of ports 22 (supply 43, control 45, and exhaust 47) generally aligned with the armature ports 20, the armature ports 20 being in fluid communication with each other by means of a centrally disposed passage 24.

The electromagnetic portion 17 of the armature 12 and the hydraulic portion 15 of the armature 12 are preferably made of different materials; the electromagnetic portion 17 being made of a magnetizable material and the hydraulic portion 15 being made of a nonmagnetizable material. The electromagnetic portion 17 includes two prongs 30 which are parallel to the axis of the armature 12 and are centrally offset therefrom, the prongs 30 being made of a magnetizable material, and a 3% silicon steel is preferred. Alternatively, the armature 12 is of unitary construction being made of a magnetizable material (such as the 3% silicon steel).

The home position of the armature 12 as viewed from the spring adjustment mechanism hereinafter described is in the extreme counterclockwise position, when the regulator 10 is de-energized and there is no supply pressure. The range of armature 12 rotation is determined by mechanical stops 58. In the home position an armature stop 34 is forced in to contact with the valve body abutment 36 because of the spring force, hereinafter described. When energized the armature 12 rotates in a clockwise direction until the spring torque is equal to the magnetic torque.

FIGS. 3, 4, 5, and 6 depict the relative positions of the armature ports 20 and the valve body ports 22 during the operation of the pressure regulator.

Figure 3:
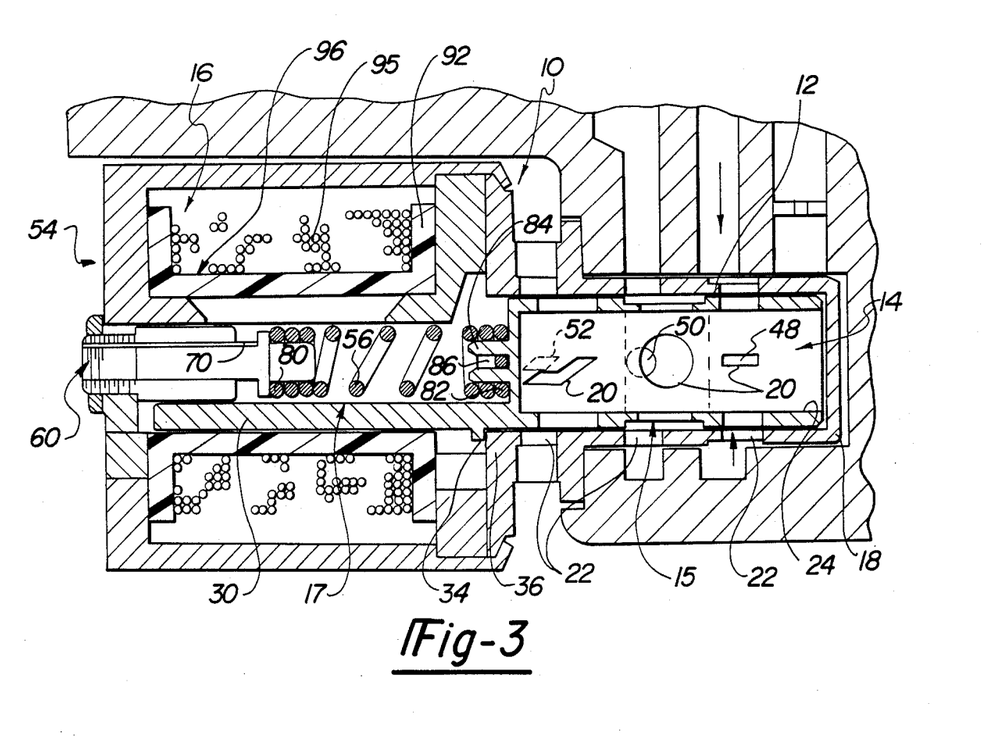
FIG. 3 is a partial sectional view showing the position of the armature ports relative to the valve body ports when the armature is in the home position.

FIG. 3 shows the position of the armature ports 20 relative to the valve body ports 22 when the armature 12 is in the home position. In this position the supply orifices 48 are fully open and the exhaust orifice 52 is fully closed. The control ports of the armature 44 and the control ports of the valve body 45 are always in full fluid communication with each other.

The hydraulic portion 15 of the armature 12 preferably has an even number of supply ports 42, an even number of control ports 44, and an even number of exhaust ports 46. The hydraulic portion has hollow passage 24 which enables the various armature ports 20 to be in fluid communication with each other. The valve body ports 22 are equal in number to and similarly arranged with the armature ports 20. These ports cooperate to determine the axial position of the armature 12 relative to the valve body 18. As the armature 12 is displaced relative to the valve body 18, the size of the orifices varies.

The supply ports 42 are evenly spaced around the circumference of the armature 12, and are centered about a plane which is normal to the axis of the armature 12. The supply ports 42 are in the shape of a parallelogram (preferably a rectangle), and are disposed about the armature 12 so that the longer axis of the rectangular port is parallel to the axis of the armature 12. Alternatively, the supply ports 42 may be a series of holes, diagonally aligned and nearly tangent to each other for ease of machining (not shown). The supply ports 42 are normally fully open as shown in FIG. 3. The supply orifice 48 is the common opening shared by an armature supply port 42 and a valve body supply port 43. The cross sectional area of the supply orifice 48 will be a linear function of the tangential and axial displacement. The shape of the supply orifices 48 are always a parallelogram.

The control ports 44 are evenly spaced around the circumference of the armature 12, and are centered along a plane which is normal to the axis of the armature 12. The control ports 44 are circular in shape. The armature control ports 44 may be sized differently from the valve body control ports 45, to enable the armature control ports 44 to be in hydraulic communication with the valve body control ports 45 throughout the full range of axial and rotary displacement of the armature 12 relative to the valve body 18.

The exhaust ports 46 are evenly spaced around the circumference of the armature 12, and are centered along a plane which is normal to the axis of the armature 12. The valve body exhaust ports 47 are in the shape of a rhombus, and the armature exhaust ports 46 are in the shape of a larger rhombus with a smaller rhombus cutaway therefrom one corner. The exhaust orifices 52 are normally closed. As a result of the difference in shapes of the armature exhaust ports 46 relative to the valve body exhaust ports 47, the shape of the exhaust orifice 52 may be any of several different geometric shapes depending upon the axial and rotational position of the ports.

Figure 4:
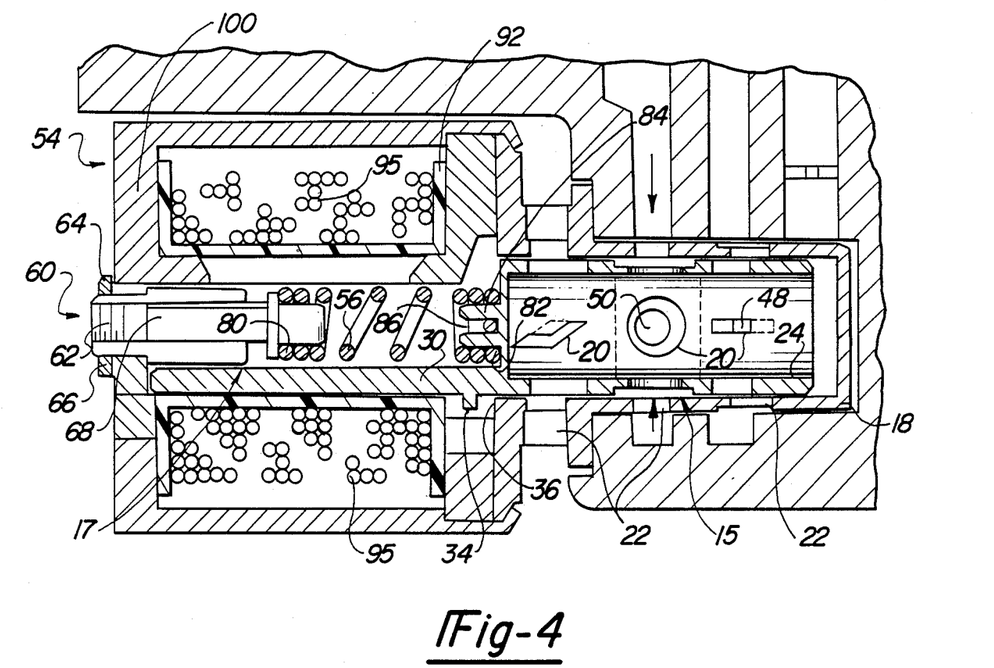
FIG. 4 is a partial sectional view showing the relative position of the ports when the axial position only of the armature has been displaced relative to the valve body.

FIG. 4 shows the relative position of the armature ports 20 to the valve body ports 22 when the axial position only of the armature 12 has been displaced relative to the valve body 18. In this position the armature supply ports 42 are in partial fluid communication with the valve body supply ports 43, and the armature exhaust ports 46 are fully closed. As the exhaust ports are opened, the supply ports are throttled, causing a drop in the control pressure. Axial and tangential motion determines the supply and the exhaust orifice area.

When the control pressure is too high, the armature 12 moves axially towards the top of regulator 10, compressing the spring 56. This movement opens the exhaust orifices 52 and throttles the supply orifices 48. When the control pressure is too low, the armature 12 moves axially towards the bottom of the regulator 10 which restricts the exhaust orifices 52 and opens the supply orifices 48.

Figure 5:
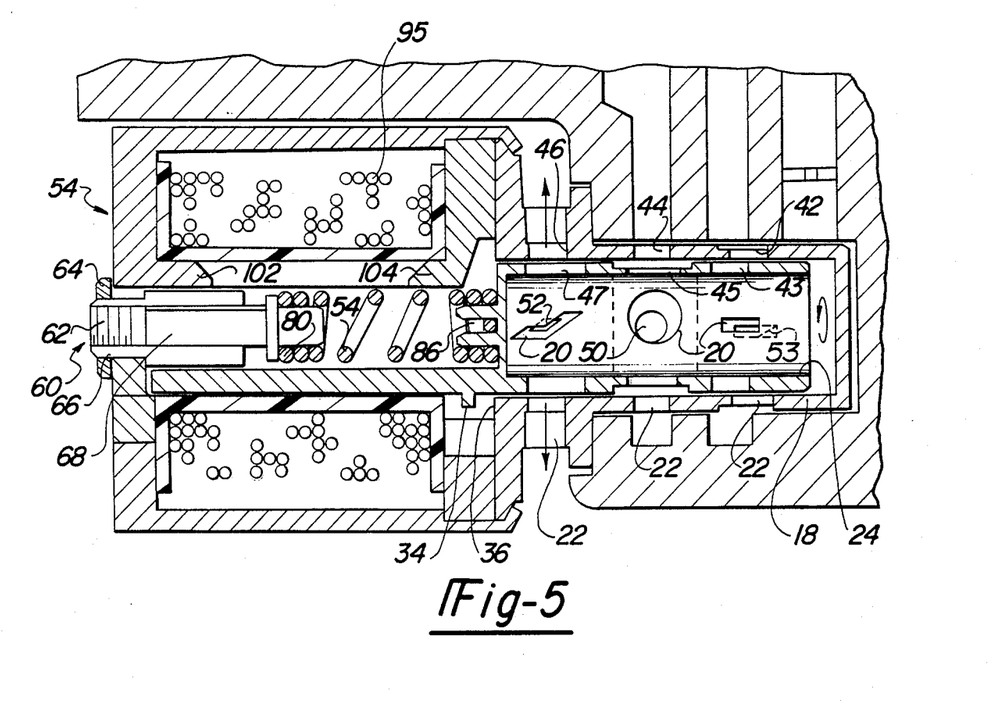
FIG. 5 is a partial sectional view showing the relative position of the ports when the rotary position only of the armature has been displaced relative to the valve body.

FIG. 5 shows the relative position of the armature ports 20 to the valve body ports 22 when the tangential position only of the armature 12 has been displaced relative to the valve body 18. In this position the armature supply ports 42 are in partial fluid communication with the valve body supply ports 43 and the armature exhaust ports 46 are in partial fluid communication with the valve body exhaust ports 47. When the exhaust orifice 52 is in partial fluid communication with each other, part of the valve body exhaust port 47 overlaps with part of the respective armature exhaust port 46, as seen in FIGS. 4 and 5.

Figure 6:
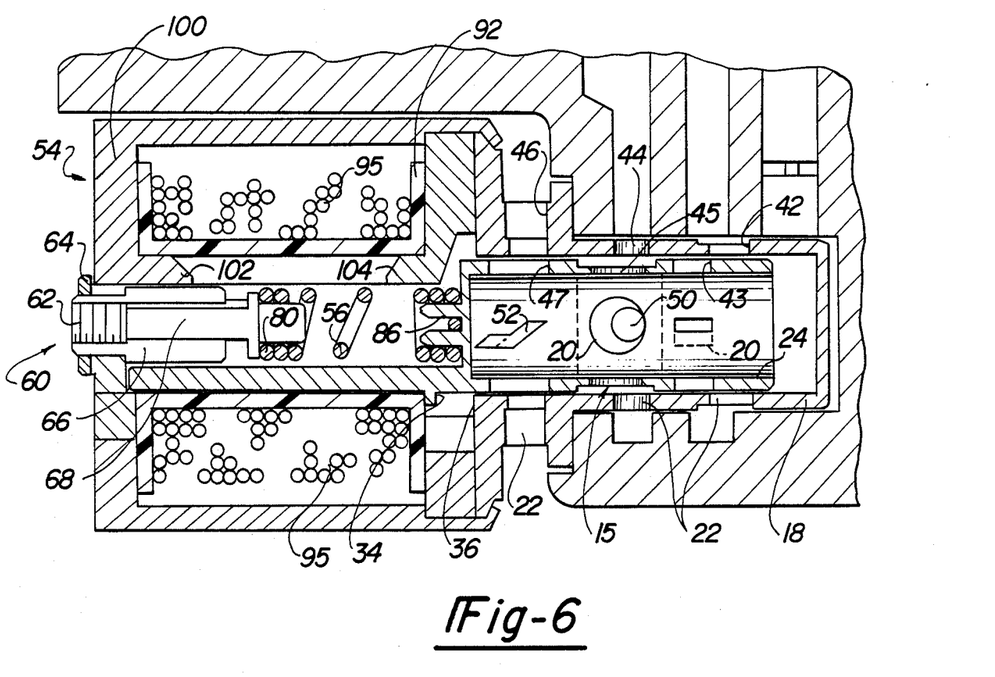
FIG. 6 is a partial sectional view showing the extreme displaced position of the armature relative to the valve body in both the axial and the rotary directions.

FIG. 6 shows the relative position of the armature ports 20 with the valve body ports 22 when the armature 12 is in the extreme displaced position in both the axial and the tangential directions relative to the valve body 18. In this position the supply orifices 48 are fully closed, the exhaust orifices 52 are fully open, and the control pressure is at its minimum value.

A housing 54 is disposed around the electromagnetic compartment 16 of the regulator 10. A compression spring 56 is generally centrally disposed within the electromagnetic compartment 16. One end of the spring 56 is secured to the armature 12 and the other end of the spring 56 is secured to the regulator housing 54. The spring 56 provides an axial force and torque which resist movement of the armature 12 from its home or de-energized position. The forces which are the result of the control pressure compress the spring 56, and the magnetic forces apply torque on the spring 56. The spring 56 resists both the axial displacement and the tangential displacement of the armature 12. The spring 56, which is a right hand compression spring, provides an axial force and torque to armature 12 as spring 56 seeks to restore armature 12 to the home position.

Figure 2:
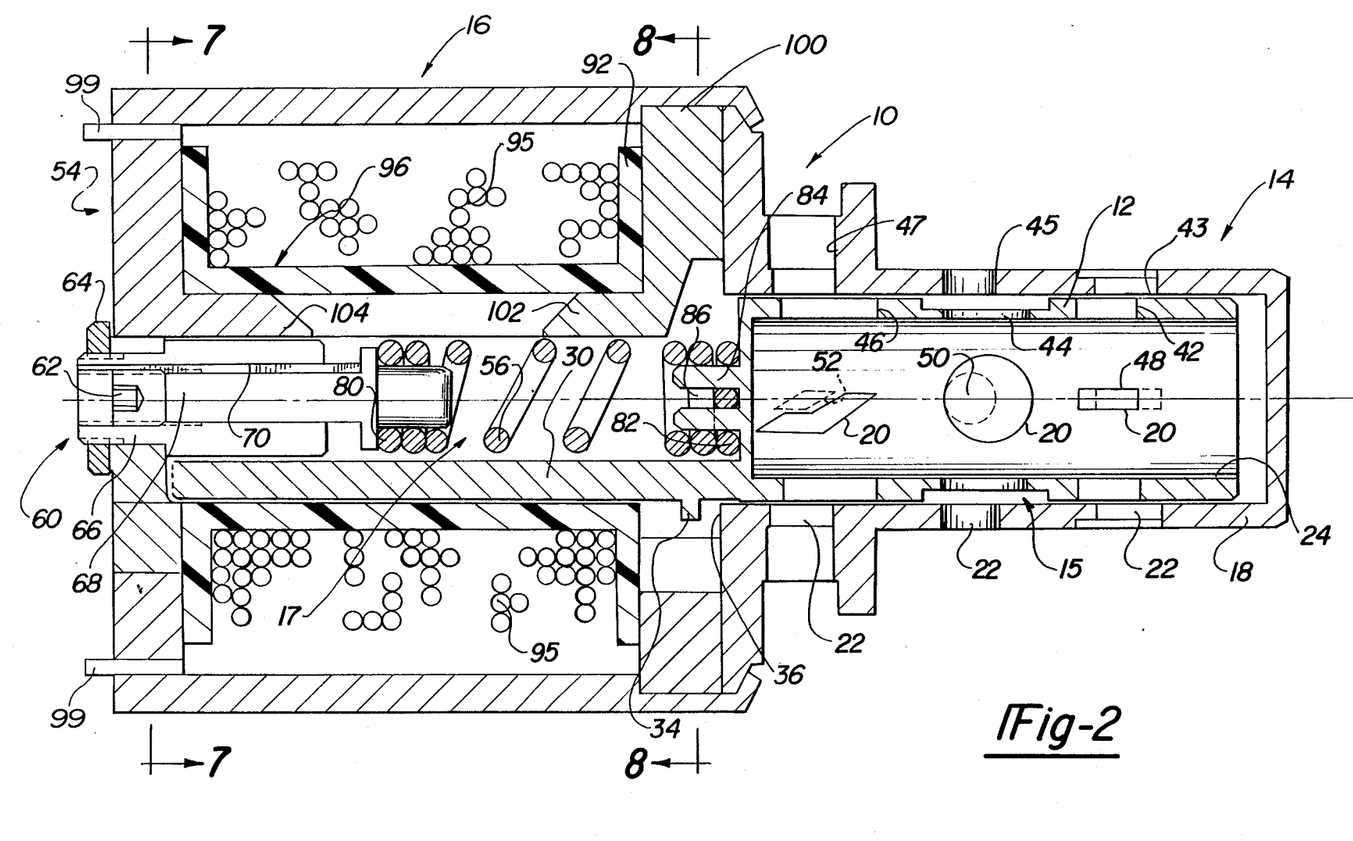
FIG. 2 depicts a full sectional view of the pressure regulator, incorporating the armature shown in FIG. 1.

The spring 56 is centrally engaged with the regulator housing 54 by means of a spring adjustment mechanism 60. The spring adjustment mechanism 60 as shown in FIG. 2 is mounted in the pressure regulator housing 54 and serves the dual purpose of sealing the regulator 10 from external contaminants and enabling the setting of the initial spring compression. The mechanism 60 includes a setscrew 62, a nut 64, a spacer 66, and a spring seat 68. The setscrew 62 and the nut 64 protrude from the end of the housing 54, so that they can be externally adjusted. The setscrew 62 is threadedly engaged within the spacer 66. As the setscrew 62 is inserted or withdrawn from the spacer 66, the spring seat 68 is lowered or raised in the spacer 66, which changes the spring compression (the axial spring forces). The nut 64 is threadedly engaged with the top of the spacer 66 and secures the spacer 66 in place within the regulator housing 54. The spring seat 68 is keyed to the spacer 66 by key 70 to prevent rotation of the spring seat 68 when torque is applied to the spring 56. The bottom of the spring seat 68 is engaged with the top of the spring 56.

Figure 7:
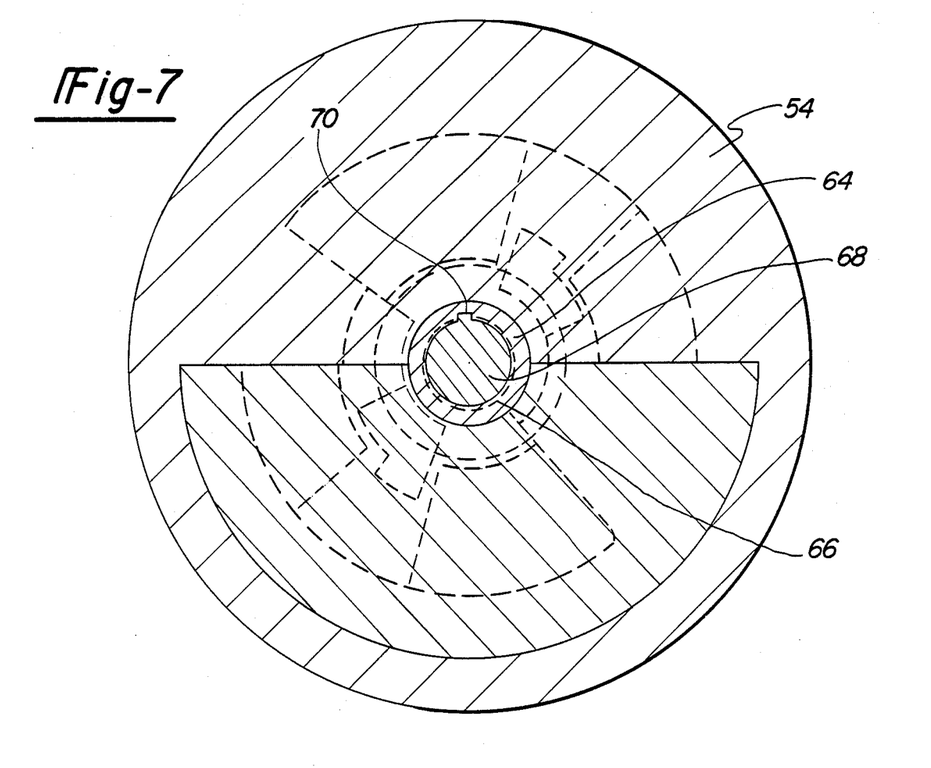
FIG. 7 depicts a sectional view of the embodiment shown in FIG. 2 taken along section line 7—7.
Figure 7A:
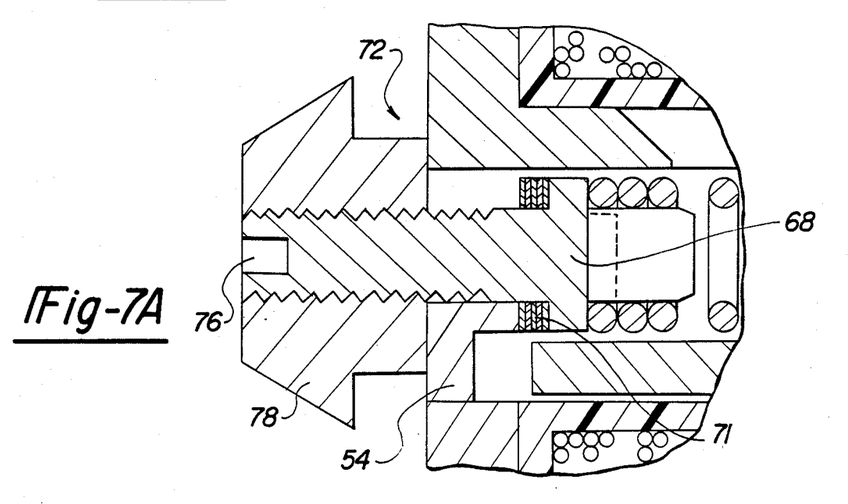
FIG. 7A is an embodiment of another spring adjustment mechanism.

FIG. 7A depicts another embodiment of a spring adjustment mechanism 72. Shims 71 are inserted between the springseat 68 and the housing 54 to raise or lower the seat 68. The seat 68 has a screwdriver slot 76 and is threadedly engaged to nut 78. To adjust the rotary position of the mechanism 72, seat 68 is rotated relative to the nut 78.

Figure 8:
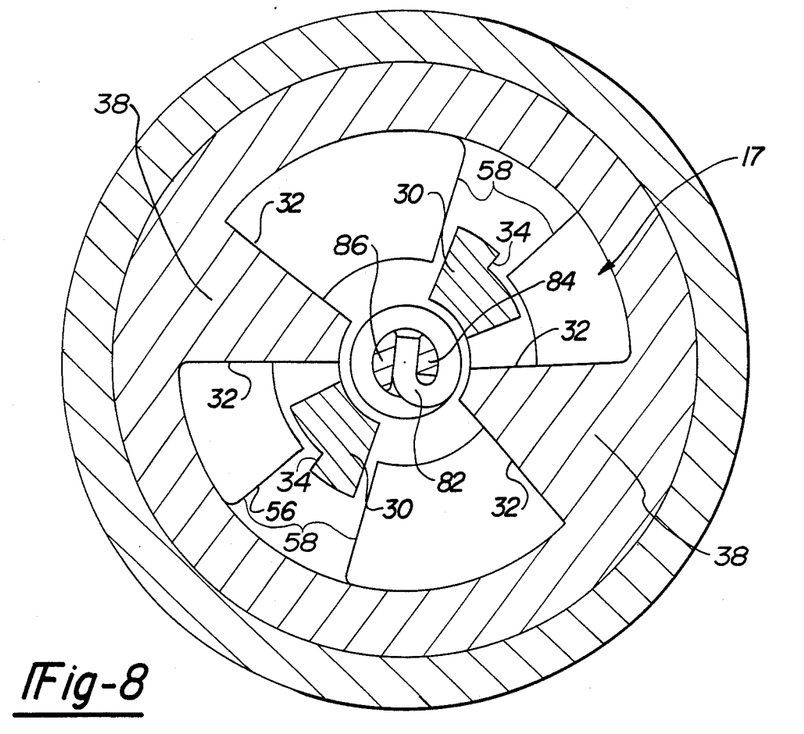
FIG. 8 depicts another sectional view of the embodiment shown in FIG. 2 taken along Section 8—8.

As depicted in FIG. 8, the spring 56 has one inwardly folded tail 80 and 82 located at each spring end. Each tail 80 and 82 passes through the centerline of the spring 56. The first tail 80 is engaged in a recess between two fingers 84 which are integral to the spring seat 68. The second tail 82 is engaged in a recess 86 between two fingers 84 which are integral to the armature 12. Both ends of the spring 56 are identical. The last three coils at each end of the spring 56 are closed to secure the eccentricity of the spring 56, to enable the spring 56 to be centrally disposed on the fingers, and to prevent the spring 56 from buckling.

The armature 12 is movable rotatably relative to the regulator 10 and the spring 56 resists the rotational movement of the armature 12. The armature 12 is movable axially relative to the regulator 10 and the spring 56 resisting the axial movement of the armature 12. The armature 12 and the spring 56 are the only moving parts of the regulator 10.

The spring adjustment mechanism 60 is used to adjust the initial compression of the spring 56. The control pressure is set for a specific supply pressure, both of which are determined by the particular flow application. The flows are monitored and the spring seat 68 is adjusted accordingly. Preferably, at the initial calibration the supply orifice 48 is maximum and the exhaust orifice 52 is zero. The spring seat 68 is located within the regulator 10 so that it will apply torque on the armature 12 with minimal radial force.

Two armature prongs 30 extend through the electromagnetic portion 17, and cause the armature 12 to move tangentially corresponding to the applied current thereby changing the size of the airgap. A bobbin 92 is positioned around the armature 12. The bobbin 92 provides protective space for the magnetic windings 96. An electromagnetic actuator 98 consists of the two terminals 99 of the coils 95 and the electromagnets. The two terminal 99 conduct the electricity from an external connector (not shown) to the windings 96. A flux washer 100 is positioned within the housing 54 and about the armature 12. The washer 100 has two symmetrical and stationary branches 102 which extend upward towards the spring adjustment mechanism 60, and the branches 102 being part of the flux path. Similarly, two symmetrical and stationary housing branches 104 extend downward from the housing 54 adjacent to the spring adjustment mechanism 60 and towards the washer branches 102, the housing branches 104 being part of the flux path 110. The housing 54, the armature 12, and the washer 100 each are made of magnetizable materials. The armature 12 is rotatable relative to the housing 54. The flux washer 100 is disposed around the armature 12 between the valve body 18 and the housing 54. The flux washer 100 conducts the magnetic flux, and provides the lower portion of the tangential magnetic airgap.

Figure 8A:
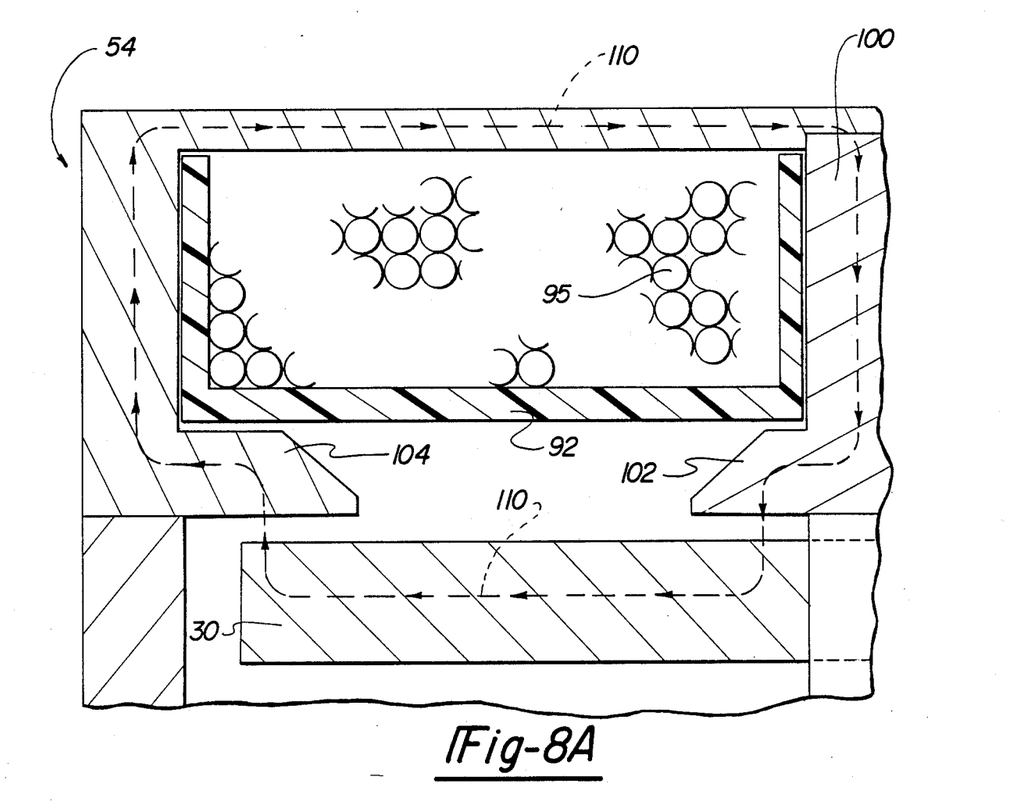
FIG. 8A shows the flux path through the electromagnetic compartment of the FIG. 2 embodiment.

As current is circulated through the coils 95, the actuator 98 generates a flux path which flows through the washer 100 and the washer branches 102, the housing 54 and the housing branches 104, and the armature prongs 30 (see flux path in FIG. 8A). As the coil 95 becomes energized the armature 12 rotates clockwise. The rotation causes the exhaust orifice 52 to open and together with a clockwise movement throttles the supply orifices 48 causing the control pressure to drop, thereby changing the balance of forces between the hydraulic portion of the armature 15 and the spring 56. The drop in control pressure causes the armature 12 to move in a downward direction, which throttles the supply orifices 48 and opens the exhaust orifices 52. The armature 12 moves relative to the valve body 18 in the axial and the tangential directions simultaneously in a diagonal direction along the surface of the armature in a helical trace path 53 (FIG. 5). The rotational position of the armature 12 relative to the washer 100 is varied in response to changes in the current flow. The higher the current, the more flux is generated, and the greater is the torque applied to rotate the armature 12.

Any radial forces in the armature 12 are highly undesirable, since the radial forces cause friction between the armature 12 and the valve body 18. The regulator 10 is designed so that all forces are either in the axial or the tangential directions, and radial forces are minimized. Changes in the magnetic energy causes a pure torque (only tangential and no radial forces). The magnetic and spring torque cause minimal frictional forces between the armature 12 and the valve body 18.

An airgap exists between the armature prongs 30 and the washer branches 102, and an airgap exists between the armature 12 and the housing branches 104. These airgaps are part of the flux path 110, and the size of the airgaps decreases with increased torque. The axial position of the armature 12 is independent of the electromagnetic airgap, since the airgap is determined solely by the amount of applied current. This is necessary to eliminate unstable magnetic forces within the pressure regulator. The smaller the airgap, the greater are the rotational forces applied to the armature 12 by the spring 56, and the greater is the current required to hold the armature 12 and the spring 56.

The axial displacement of the armature 12 changes the surface area of the engagement surfaces between the housing branches 104 and the armature prongs 30. However, this change in surface area does not effect the practical torque. The magnetic airgap is independent of the axial displacement of the armature 12 and the control pressure, the size of the magnetic airgap and the relative rotational displacement of the armature 12 being a function of the applied current only. Changes in the control pressure cause only axial displacement and do not effect the airgap established by the electric current. This is necessary to eliminate unstable forces within the regulator 10. When the control pressure is balanced, the armature 12 moves in the axial direction which changes the size of the orifices. The magnetic forces rotate the armature 12, which also changes the size of the orifices.

Figure 9:
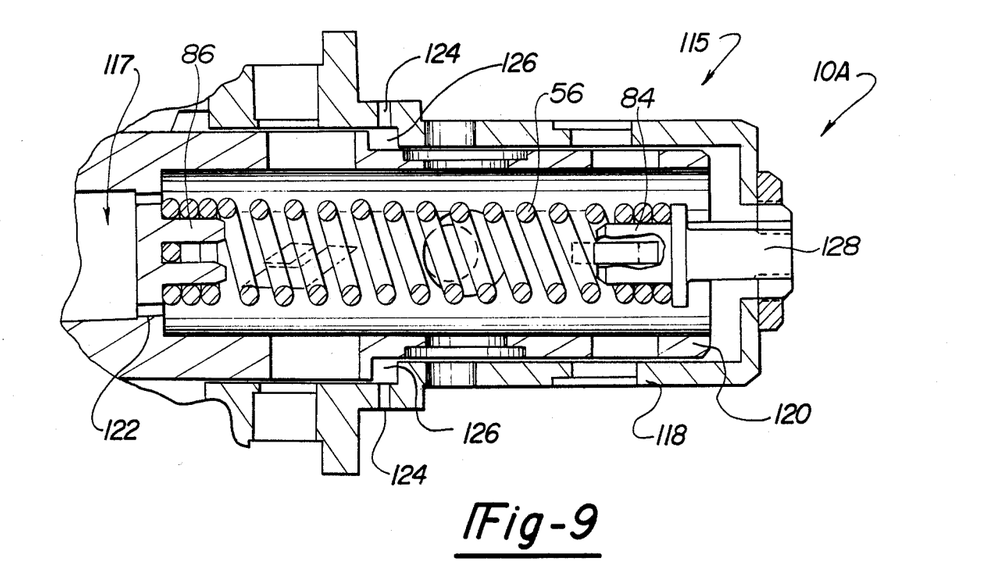
FIG. 9 depicts another embodiment of the armature and spring of the present invention.

FIG. 9 shows another embodiment of the armature 120 of the present invention having the spring 56 mounted within the hydraulic portion 15. In this embodiment the home position of the armature 120 is upward and counter-clockwise. The armature 120 is made from a magnetizable material. Armature passages 122 fill the electro-magnetic portion 117 of the armature 120 with fluid at the control pressure to insure the same pressure throughout the armature and the housing. A low pressure pocket 126 exists in the step between the armature 120 and the valve body 118 which is vented 124 to the exhaust pressure. The purpose of the step is to provide better control on the area which determines the axial force. The spring adjustment mechanism 128 is located on the bottom of the regulator 10A (within the hydraulic compartment of the pressure regulator). The home position of the armature 120 may be designed to be either (1) upward and clockwise; (2) upward and counterclockwise; (3) downward and clockwise; or (4) downward and counterclockwise. The home position of the regulator 10A shown in FIG. 9 is upward and counterclockwise. When the control pressure is increased, the armature 120 moves downward. The regulator 10A may be designed in either the normally open or closed position, but is shown in FIG. 9 as normally open.

Figure 10:
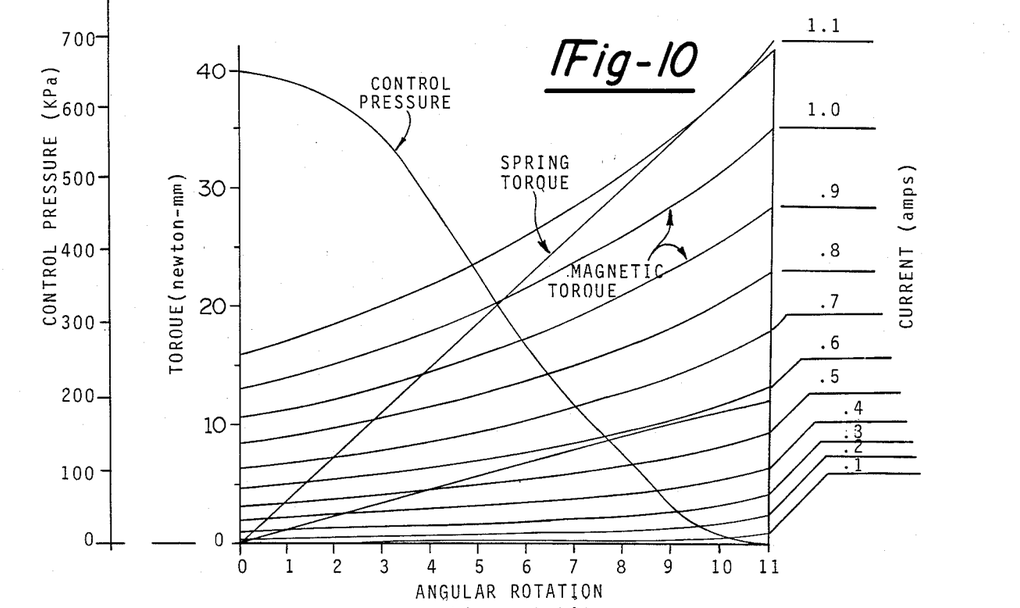
FIG. 10 is a graph that depicts a hypothetical electromagnetic torque as a function of the angular rotation of the armature.

FIG. 10 is a typical graphical representation of the electromagnetic torque as a function of the angular rotation for an armature. A family of curves are shown representing various currents that may be applied across the magnets. At a minimal current of 0.10 amps the torque is essentially zero, whereas a current of 1.10 amps represents a torque exceeding 40 newton-millimeters at a displacement of 11.0°. The spring torque is essentially linear, intersecting the origin, and increasing with increased angular displacement. When 1 amp is applied, the spring torque equals the magnetic torque at an angular rotation of about 5.3° (the equilibrium position of the armature).

For the particular pressure regulator graphically represented in FIG. 10 (similar to the pressure regulator shown in FIG. 1), the hydraulic portion 15 of the armature 12 has eight supply ports 42, four control ports 44, and eight exhaust ports 46. The control ports 44 are circular in shape, with the armature 12 having the larger circular ports, and the valve body 18 having the smaller circular ports. The range of armature rotation is about 15°. The torsional spring rate is 1.3 newton-mm/degree, and the axial spring rate is 30 newtons/mm. The control pressure of the transmission fluid may be 700 KPa for a supply pressure of 1000 KPa. The flow rate of the fluid is in the range of 0 to 100 ml/sec (at room temperature and 6.0 centistoke). The coil 95 is copper wire of 25 AWG, having about 670 turns, of 3–5 ohm resistance wire, having an inductance of 3 millihenries. The bobbin 92 is made of glass field nylon, the housing 54 is made of low carbon steel, and the washer 100 is either low carbon steel or 3% silicon iron.

The hydraulic control pressure is also depicted, and is about 700 KPa when there is no tangential displacement, gradually diminishing to about zero at a tangential displacement of about 11.0°.

Figure 11:
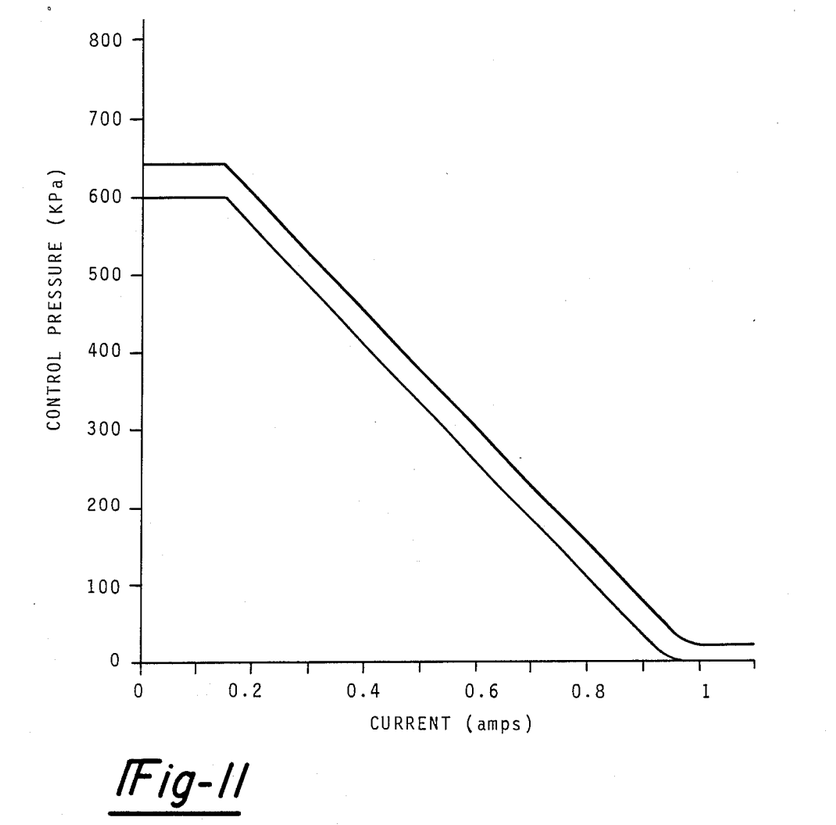
FIG. 11 is a graph that depicts the control pressure as a function of current.

FIG. 11 is depicts the control pressure as a function of current for a typical regulator 10. The range is caused by hysteresis. The appropriate value of electric current is generated for a particular control pressure by using a curve similar to the one shown in FIG. 10. The control pressure is monitored and a feedback control circuit adjusts the axial position of the armature 12 to deliver fluid at the desired control pressure.

Although this pressure regulator 10 has been specifically designed for use in electronically-controlled transmission systems, it is to be understood that the present invention is not limited to such applications, as the principles described herein are applicable wherever a hydraulic pressure is to be regulated.

While the pressure regulator and the armature have been described in conjunction with specific embodiments, it is evident that many alternatives, modifications, and variations will be apparent to those skilled in the art in light of the disclosure herein. It is intended that all such alternatives, modifications, and variations are included herein that fall within the spirit and scope of the appended claims.

I Claim:

1. A pressure regulator having a hydraulic compartment and an electromagnetic compartment, the regulator maintaining a fluid flow at an essentially constant control pressure within a flow range, the regulator comprising:
   (a) an armature which is generally centrally disposed within the regulator and extending in both the hydraulic compartment and the electromagnetic compartment, the armature having a hydraulic portion and an electromagnetic portion, the hydraulic portion of the armature being generally centrally disposed within a valve body, the armature having a plurality of ports and the valve body having a plurality of ports, some of the valve body ports being aligned with some of the armature ports, the armature ports cooperating with the valve body ports which enable fluid to enter and leave therefrom, wherein axial forces are applied to the armature as a function of the fluid flow through the ports;
   (b) spring means secured to the armature which enable axial and tangential displacement of the armature; and
   (c) an electromagnetic actuator which is positioned in the electromagnetic compartment within a stationary housing, wherein tangential forces are applied to the armature as a function of the magnitude of the magnetism in the actuator.

2. The regulator of claim 1, wherein the spring resists the tangential movement of the armature, and the spring means resists the axial movement of the armature.

3. The regulator of claim 1, wherein the tangential displacement of the armature is independent of the control pressure.

4. The regulator of claim 1, wherein the tangential displacement of the armature is independent of the axial displacement of the armature.

5. The regulator of claim 1, wherein the forces applied to the armature by the fluid are normal to the forces applied to the armature by the actuator.

6. A pressure regulator for electronically-controlled transmission systems, the regulator having a hydraulic compartment and an electromagnetic compartment, the regulator maintaining a fluid flow at an essentially constant control pressure within a flow range, the regulator comprising moving members and stationary members, a regulator armature being a moving member, the armature having a rotational position and an axial position, relative to the stationary member, the regulator having an electrical coil which is a stationary member, the regulator comprising:
   (a) means for determining the rotational position of the armature relative to the stationary members in response to an electrical excitation of a coil; and
   (b) means for adjusting the axial position of the armature relative to the stationary members in response to changes in the control pressure.

7. The regulator of claim 6, wherein the rotational displacement of the armature relative to the stationary members is independent of the control pressure.

8. The regulator of claim 6, wherein the rotational displacement of the armature relative to the stationary members is independent of the axial displacement of the armature relative to the stationary members.

9. The regulator of claim 6, wherein the rotational displacement of the armature relative to the stationary members is a function of the supply current only.

10. The regulator of claim 6, wherein the electrical excitation of the coil causes purely torque forces to be applied to the armature, with minimal radial forces.

11. A pressure regulator having a hydraulic compartment and an electromagnetic compartment, the regulator maintaining essentially a constant control pressure within a prescribed flow rate range, the regulator comprising:
   (a) an armature which is generally centrally disposed within the pressure regulator, the armature having a hydraulic portion and an electromagnetic portion, the hydraulic portion being generally centrally disposed within a valve body, the armature having a plurality of ports which enable fluid to enter and leave therefrom, the valve body having a plurality of ports generally aligned with some of the armature ports, the armature having an electromagnetic compartment with two elongated prongs, the prongs being made of a magnetic material;
   (b) a compression spring which is generally centrally disposed within the electromagnetic compartment of the armature, one end of the spring being secured to the armature the armature being displaceable rotatably relative to the regulator and the spring resisting the rotational displacement of the armature, the armature being displaceable axially relative to the regulator and the spring resisting the axial displacement of the armature; and
   (c) a housing disposed around the electromagnetic compartment of the regulator, the other end of the compression spring being secured to the regulator housing, and a bobbin positioned around an electromagnet means, and a washer positioned within the housing and about the armature, the housing and the hydraulic portion of the armature and the washer each being made of magnetizable materials, the armature being rotatable relative to the housing, the bobbin being positioned around the armature, the washer being disposed around the armature between the valve body and the housing; wherein a flux path is generated through the washer and the housing and the armature as the amount electric current flow is changed within the electromagnetic means, and the rotational displacement of the armature relative to the washer is varied in response to the change in the current.

12. The pressure regulator of claim 11, wherein the rotational displacement of the armature is independent of the axial displacement of the armature.

13. The pressure regulator of claim 11, wherein the spring has one inward folded tail located at each spring end, each tail passing through the center of the spring, the first tail being affixed to the regulator housing, and the second tail being engaged in a recess between two fingers which are integral to the armature.

14. The pressure regulator of claim 11, wherein the armature and the spring are the only moving parts of the regulator.

15. The pressure regulator of claim 11, wherein the armature and the valve body have a cooperating step therebetween.

16. As elongated armature for use in a pressure regulator, the armature having a hydraulic portion and an electromagnetic portion, a compression spring being generally centrally engagable to the electromagnetic portion, the armature comprising:
(a) a plurality of ports in the hydraulic portion, the hydraulic portion being generally cylindrical in shape, the ports being in fluid communication with each other by means of an essentially centrally disposed passage;
(b) two elongated prongs which extend essentially throughout the electromagnetic portion of the armature, the prongs being made of a magnetizable material; and
(c) means for engaging the spring to the armature, the engaging means being disposed between the prongs.

17. The armature of claim 16, wherein the ports comprise a plurality of supply ports, the supply ports being evenly spaced about the circumference of the hydraulic portion of the armature, and the supply ports being centered about a plane which is perpendicular to the axis of the armature.

18. The armature of claim 16, wherein the ports comprise a plurality of control ports, the control ports being evenly spaced about the circumference of the hydraulic portion of the armature, and the control ports being centered about a plane which is perpendicular to the axis of the armature.

19. The armature of claim 16, wherein the ports comprise a plurality of exhaust ports, the exhaust ports being evenly spaced about the circumference of the hydraulic portion of the armature, and the exhaust ports being centered about plane which is perpendicular to the axis of the armature.

20. The armature of claim 16, wherein the spring engaging means, consists of a pair of fingers protruding into the electromagnetic portion of the armature, the fingers being disposed between the prongs, the fingers having a central recess therein.

* * * * *